United States Patent [19]

Jong

[11] 4,094,330

[45] June 13, 1978

[54] WALKER

[76] Inventor: Slosson B. Jong, 20722 Hunter La., Huntington Beach, Calif. 92646

[21] Appl. No.: 759,458

[22] Filed: Jan. 14, 1977

[51] Int. Cl.[2] .............................................. F16M 13/08

[52] U.S. Cl. ........................................ 135/67; 135/69; 403/108; 403/362

[58] Field of Search ............................. 135/67, 69, 75; 403/362, 108

[56] References Cited

U.S. PATENT DOCUMENTS

| | | | |
|---|---|---|---|
| 332,684 | 12/1885 | Tuttle | 135/69 X |
| 1,256,350 | 2/1918 | Mielcarek | 135/69 |
| 1,315,097 | 9/1919 | Denney | 135/67 |
| 2,143,005 | 1/1939 | Green | 403/362 X |
| 2,373,045 | 4/1945 | Osborn | 135/69 |
| 2,426,074 | 8/1947 | Watters | 135/69 |
| 2,657,944 | 11/1953 | Miller | 403/362 X |
| 2,670,748 | 3/1954 | Greene et al. | 135/69 |
| 2,708,473 | 5/1955 | Gable et al. | 135/67 |
| 2,734,554 | 2/1956 | Ries | 135/67 X |
| 3,335,735 | 8/1967 | Colegrove et al. | 135/69 |
| 3,421,529 | 1/1969 | Vestal | 135/67 |
| 3,442,276 | 5/1969 | Edwards et al. | 135/67 |
| 3,516,425 | 6/1970 | Rigal | 135/67 |

FOREIGN PATENT DOCUMENTS

| | | | |
|---|---|---|---|
| 463,774 | 3/1950 | Canada | 135/67 |

*Primary Examiner*—Werner H. Schroeder
*Assistant Examiner*—Conrad L. Berman
*Attorney, Agent, or Firm*—William P. Green

[57] ABSTRACT

A walker which includes side sections interconnected adjustably by a transverse connector formed of telescopically interfitting parts. The walker has legs with both coarse and fine length adjustments, with the coarse adjustments being provided by detents receivable selectively in different apertures in coacting parts, and with the fine adjustments being provided by threadedly interconnected elements.

6 Claims, 4 Drawing Figures

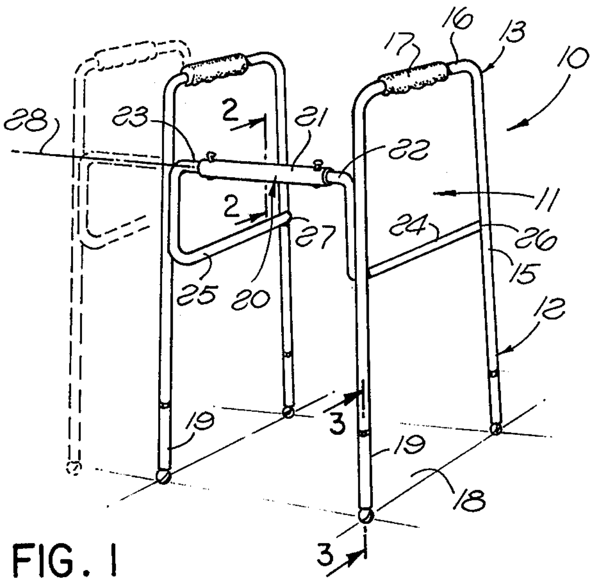
FIG. 1
FIG. 2
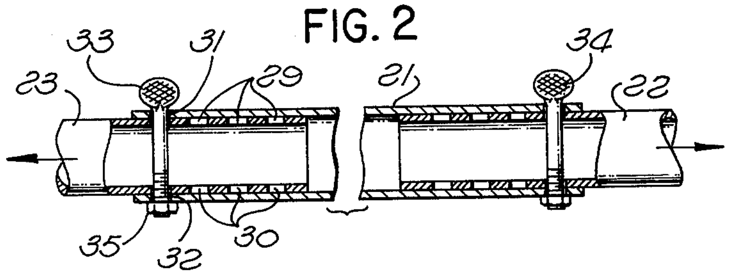
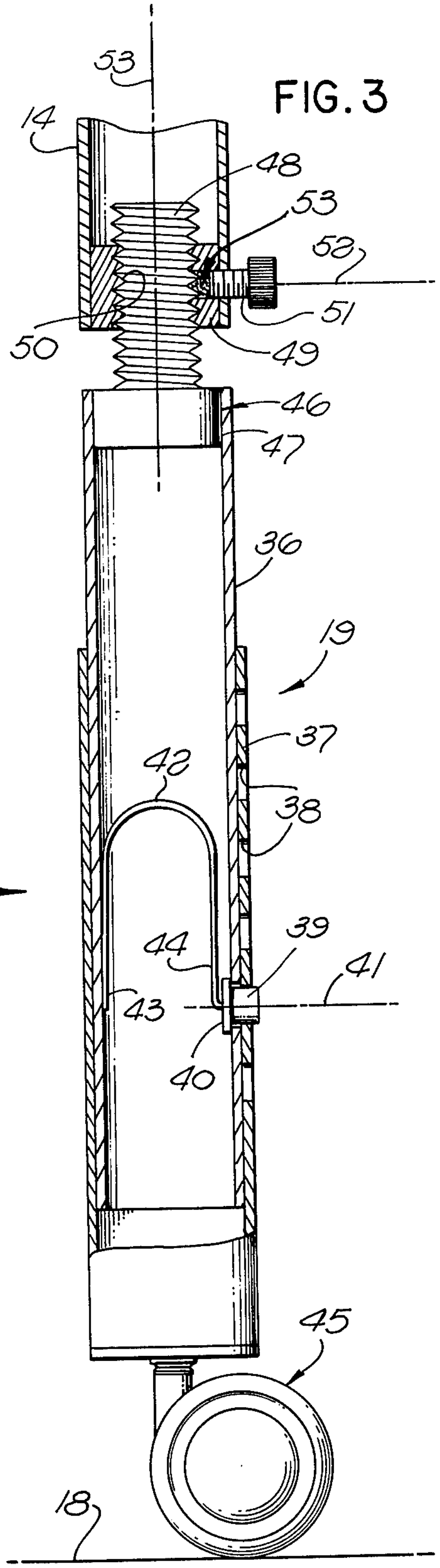
FIG. 3
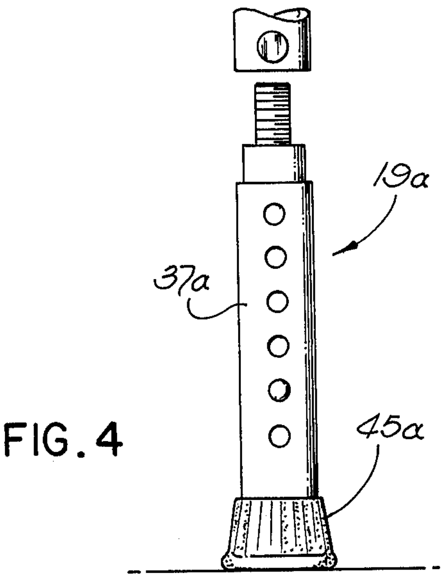
FIG. 4

WALKER

BACKGROUND OF THE INVENTION

This invention relates to improved walkers for use by invalids or others requiring support when walking.

Many conventional walkers are very bulky and difficult to transport from place to place, and cannot be reduced in size for such transportation, or adjusted to different widths for use by persons of different sizes. Some have been devised which allow a width adjustment, such as for example the arrangement shown in U.S. Pat. No. 2,734,554, but the types of folding connections utilized for this purpose have been of a character detracting very substantially from the strength and rigidity of the overall walker structure in use, and thereby materially decreasing the practicability of the device for its intended purpose. Another type of collapsible walker is shown in U.S. Pat. No. 3,442,276, but that arrangement does not allow an effective width adjustment of the walker, and again would appear to provide inadequate strength of the assembled unit.

Another disadvantage of previously proposed walkers resides in the difficulty in so constructing the walkers as to bring the lower ends of their support legs into a common plane for simultaneous engagement with a floor surface. This problem of attaining precisely identical leg length has been especially compounded when legs are adjustable, in which case accurate setting of the leg lengths in all of the different adjusted positions is difficult to attain without greatly increasing the cost of the overall item.

SUMMARY OF THE INVENTION

One object of the present invention is to provide an improved adjustable width walker, in which the two hand grasped side sections of the device can be adjusted toward and away from one another, while in a predetermined essentially parallel relation of proper front to rear alignment with the direction of travel, and can be locked in any of these settings in a relation providing a rigid walker structure affording good support to the user. To attain this purpose, I provide a connector structure extending between the two opposite side sections, with this connector structure having two telescopically interfitting tubes, and means for retaining the tubes in differently adjusted settings. Preferably, the two tubes are completely detachable to enable the two side sections to be separated from one another and carried in a reduced dimensioned condition when not in use. The connector structure may include a central tube which is separable from both side sections, and which interfits telescopically with tubes projecting laterally from each of the side sections.

An additional purpose of the invention is to provide improved adjustable leg structures, in which each leg has both a coarse adjustment and a fine adjustment, to enable very accurate adjustment of the lengths in a manner assuring that all of the legs can contact a floor surface simultaneously. At the same time, this unique dual adjustment is attained with a very simple type of structure capable of easy mass production at low cost. More particularly, each of the legs includes a telescopic coarse adjustment in which a detent element carried by one part is selectively receivable within any of different apertures formed in the other part; and in conjunction with this coarse type of adjustment the individual legs include two threaded parts which by threaded interconnection allow a fine adjustment of the length between the settings of the detent and aperture elements.

BRIEF DESCRIPTION OF THE DRAWING

The above and other features and objects of the invention will be better understood from the following detailed description of the typical embodiment illustrated in the accompanying drawing in which:

FIG. 1 is a perspective view of a walker constructed in accordance with the invention;

FIG. 2 is an enlarged fragmentary vertical section taken on line 2—2 of FIG. 1;

FIG. 3 is an enlarged fragmentary vertical section taken on line 3—3 of FIG. 1; and FIG. 4 shows the manner in which leg extensions having rubber feet at their lower ends can be substituted for the caster type extensions of FIGS. 1 - 3.

DESCRIPTION OF THE PREFERRED EMBODIMENTS

The walker shown at 10 in FIG. 1 includes two similar side sections 11 and 12, each of which includes an inverted U-shaped member 13 having two downwardly projecting front and rear leg portions 14 and 15 interconnected at their upper ends by an essentially horizontal portion 16 about which a rubber grip element 17 is carried. The parts 13 are formed of tubing bent to the illustrated inverted U-shaped configuration, with the front and rear legs 14 and 15 of each section desirably flaring slightly apart as they advance downwardly for maximum stability on a floor or other support surface 18. At the lower ends of the leg portions 14 and 15 of each part 13, there are carried a pair of identical lower leg sections or extensions 19 which will be discussed in greater detail at a later point.

The two side sections are joined rigidly together by a transverse horizontal connector structure 20, which includes a central rigid tube 21 and two tubes 22 and 23 carried by and projecting inwardly from the side sections 11 and 12 respectively. These tubes 22 and 23 may be formed integrally with and as extremities of members 24 and 25, which are bent to the illustrated configuration, to have back ends attached at 26 and 27 to vertical intermediate portions of the rear legs 15 of the two side sections, and which have forward portions 27 extending upwardly adjacent and suitably bolted or otherwise secured to the forward leg portions 14 of the side sections. At the upper ends of portions 27, the elements 24 and 25 turn inwardly toward one another and in alignment along a common transverse horizontal axis 28, which is also the axis of the discussed center tube 21. The extremities of portions 22 and 23 project telescopically into the opposite ends of tube 21, and are close fits therein to form a rigid structure with the tube 21. Each of the tube portions 22 and 23 contains a series of apertures 29 at spaced locations along its upper side and also contains a series of similar apertures 30 spaced along the underside of the tube and in alignment with the upper apertures. Each end of tube 21 has an upper aperture 31 and a lower aperture 32 corresponding in size to the apertures 29 and 30. Two screws 33 and 34 extend downwardly through the apertures 31 and 32 at the two ends respectively of tube 21, and also extend through selected aligned pairs of the apertures 29 and 30 in tubes 22 and 23, to connect tubes 22 and 23 to tube 21 in any of a series of different adjusted settings, and thereby adjust the overall length of the composite transverse connector structure 20 consisting of parts 21, 22, and 23.

Nuts 35 are detachably connected to the lower ends of screws 33 and 34, to retain the screws in set positions and to tighten the tubes together in those positions, while allowing removal of the nuts and screws when desired to alter the length setting of the connector structure 21 and the width dimension between two side sections 11 and 12. Also, the parts 22 and 23 can be removed completely from tube 21, to entirely separate the side sections and allow them to be handled separately or in closely nested relation during transportaion between different locations.

Each of the leg length adjusting and extension elements 19 includes two telescopically interfitting upper and lower tubes 36 and 37 (FIG. 3). The upper tube 36 is desirably received within the lower tube 37, and is a close fit therein to provide together an essentially rigid leg assembly. Tube 37 has a series of vertically spaced identical apertures 38, within which a detent button 39 is selectively receivable. This detent button 39 is mounted within an aperture 40 in a side of tube 36 for movement essentially radially inwardly and outwardly along the axis represented at 41 in FIG. 3, with the button 39 being yieldingly urged outwardly by a leaf spring 42 contained within tube 36 and having a first arm 43 bearing against the left side of tube 36 in FIG. 3 and a second end 44 doubled back and carrying button 39 and urging it rightwardly. As will be understood, the button 39 is receivable within any of the different apertures 38, and is held in those apertures by spring 42, to lock tubes 36 and 37 in any set position, but with the button being adapted for release by pressing it inwardly (leftwardly in FIG. 3) to move the button out of a particular one of the circular openings 38 and enable relative longitudinal shifting movement of the tubes until the button falls into another of the openings.

At its lower end, tube 37 carries a conventional caster assembly 45, adapted to engage and roll along a floor surface, sidewalk, or the like 18. At its upper end, tube 36 carries a screw 46, having an enlarged lower head 47 which is received within the upper end of tube 36 and is suitably welded or otherwise rigidly secured thereto. The upwardly projecting reduced diameter shank 48 of screw 46 has external threads which may be fairly coarse to allow for substantial axial adjustment of the parts by virture of this threaded connection. This threaded shank projects upwardly into a nut 49 which is contained within the lower tubular end of a corresponding leg portion 14 or 15 of one of the parts 13, and is welded or otherwise secured rigidly thereto. The internal threads 50 within nut 49 threadedly engage the threads of shank 48 to afford the desired vertical adjustment. A screw 51 is connected threadedly into the nut, along an axis 52 extending radially with respect to the main axis 53 of the leg, and is adapted to exert force aganist the shank 48 of the screw to lock it in a set position. This force may be transmitted to the screw through a cushion element 53 formed of leather or the like, for attaining a high frictional relationship with the screw while at the same time avoiding damage to it.

In using the arrangement of FIGS. 1–3, the two side sections 11 and 12 of the walker are adjusted to a proper laterally spaced relation in which the width dimension between the two handgrips 17 is optimum for the particular size and height of the person who is to use the walker. During such adjustment, the screws 33 and 34 of FIG. 2 are of course removed, and are ultimately inserted through the proper sets of registering apertures 29, 30, 31, and 32 to give the desired width, following which the nuts 35 are connected onto the screws and the transverse connector structure 20 is thus tightened to a rigid condition efectively joining together the two side sections 11 and 12 is fixed relation. The lower sections 19 of the legs can then be adjusted to place the handgrips at a proper height for the user, with the coarse adjustment of the legs attained by positioning of detent buttons 39 in selected proper apertures 38 in tubes 37. Fine adjustment of the different leg sections 19 can then be attained individually and very precisely by adjustment of the threaded screws 46 relative to nuts 49, and by ultimately locking the threaded connections by tightening of screws 51. These fine adjustments enable accurate setting of the height of handgrips 17, and also enable the different casters 45 to be adjusted relative to one another in a manner bringing them all into a relationship in which they can engage and be supported by a common flat support surface 18.

FIG. 4 shows fragmentarily a variational arrangement in which there are substitued for the lower leg sections 19 of FIGS. 1–3 a number of lower leg sections **19*a* which may be identical with sections 19 except that rubber cups or feet 45*a* are connected to the lower ends of the outer tubes 37*a* in lieu of casters 45. Thus, the arrangement of FIG. 4** can be employed where the user is able to lift the walker and place it down successively at different locations on a floor surface rather than rolling it along the floor surface.

While certain embodiments of the present invention have been disclosed as typical, the invention is of course not limited to these particular forms, but rather is applicable broadly to all such variations as fall within the scope of the appended claims.

I claim:

1. A walker comprising:

a frame structure having handle portions to be gripped by the two hands of a user, and having a plurality of downwardly projecting support legs;

individual ones of said legs including a lower removable extension assembly having a lower part and an upper part in the form of a tube telescopically interfitting with said lower part for longitudinal essentially vertical adjustment of the lower part relative to the upper part, a detent element carried by one of said parts and releasably receivable within any of a plurality of detent openings in the other part to releasably retain the parts in differently adjusted positions providing a coarse length adjustment for the individual legs, and a screw having a lower portion secured within an upper portion of said second part in fixed relation thereto and having a threaded shank projecting upwardly beyond said second part;

said individual legs also including a third part above said removable extension assembly, and a nut received within a lower portion of said third part in fixed relation thereto and threadedly and adjustably engaged with said shank of said screw for relative rotary adjusting movement about a generally vertical axis and providing a threaded adjustment between said second and third parts longitudinally of the individual leg lengths finer than and between the coarse settings of the detent elements.

2. A walker as recited in claim 1, including means for releasably retaining said screw and nut in different adjusted settings.

3. A walker as recited in claim 1, including a set screw carried by said third part and tightenable to exert force against said screw to lock the threaded connection in different finely adjusted set positions.

4. A walker as recited in claim 1, in which said first and second telescopically interfitting parts of an individual leg are both tubes, said detent element being carried by an inner one of said tubes and projecting outwardly into said apertures formed in the outer tube, there being a spring yieldingly urging said detent element outwardly into said apertures.

5. A walker as recited in claim 4, including a set screw extending radially through said nut and threadedly adjustable relative thereto inwardly to exert force against said first mentioned screw locking it and the nut in different set positions.

6. A walker as recited in claim 4, including a set screw extending radially through said nut and threadedly adjustable relative thereto inwardly to exert force against said first mentioned screw locking it and the nut in different set positions, and a friction element tightenable inwardly by said set screw against said first mentioned screw to lock it and said nut in different set positions.

* * * * *